(No Model.)
2 Sheets—Sheet 1.
W. H. BRISTOL.
THERMOMETER.
No. 553,202. Patented Jan. 14, 1896.
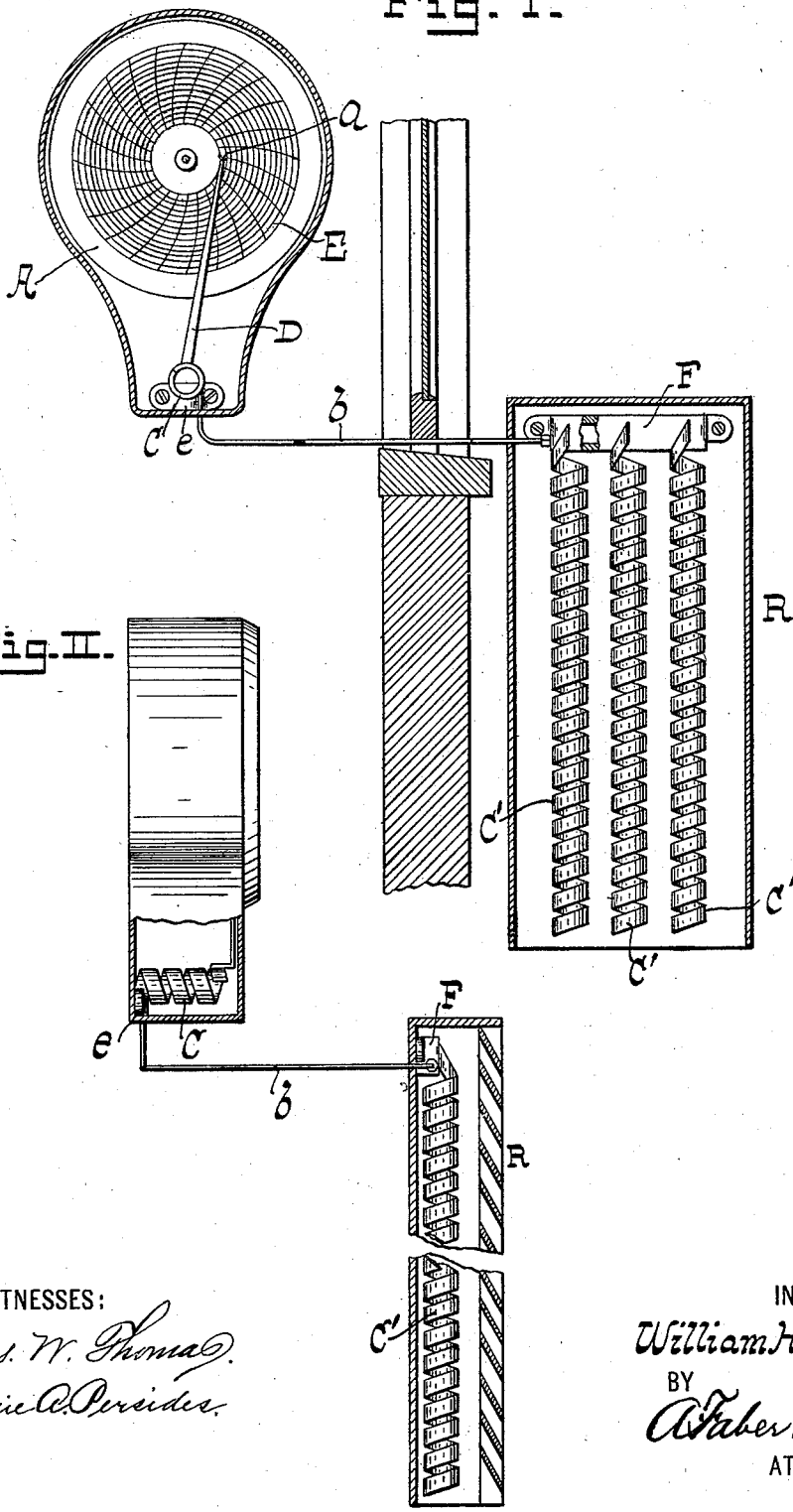
WITNESSES:
Chas. W. Thomas
Eugenie A. Persides
INVENTOR:
William H. Bristol,
BY
A. Faber du Faur
ATTORNEY (No Model.) W. H. BRISTOL. 2 Sheets—Sheet 2.
THERMOMETER.
No. 553,202. Patented Jan. 14, 1896.
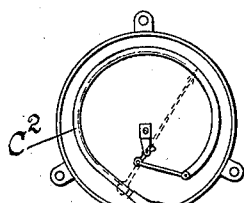
Fig. III.
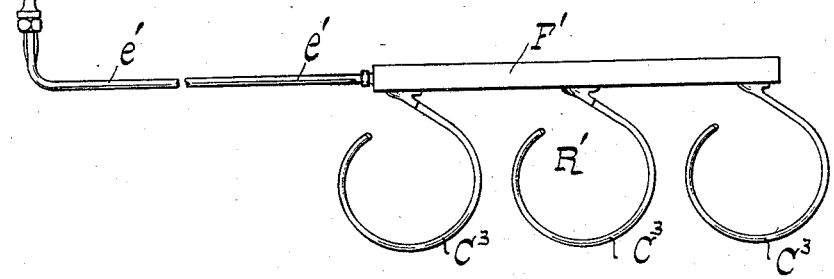
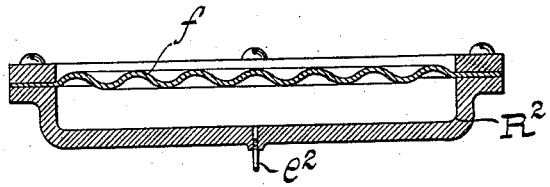
Fig. IV.
WITNESSES:
Fras. W. Thomas
Eugenie A. Persides.
INVENTOR:
William H. Bristol,
BY
A Faberdu Faur Jr
ATTORNEY ated January 14, 1896.

UNITED STATES PATENT OFFICE.

WILLIAM H. BRISTOL, OF HOBOKEN, NEW JERSEY, ASSIGNOR TO THE BRISTOL COMPANY, OF WATERBURY, CONNECTICUT, AND NEW YORK, N. Y.

THERMOMETER.

SPECIFICATION forming part of Letters Patent No. 553,202, dated January 14, 1896.

Application filed February 27, 1895. Serial No. 539,843. (No model.)

*To all whom it may concern:*

Be it known that I, WILLIAM H. BRISTOL, a citizen of the United States of America, residing at Hoboken, in the county of Hudson and State of New Jersey, have invented certain new and useful Improvements in Thermometers, of which the following is a specification.

My invention has reference to improvements in thermometers, and especially to recording-thermometers in which the expansion and contraction of a substantially incompressible fluid, due to variations in temperature, are utilized to indicate or record changes in temperature. Heretofore thermometers comprising in their construction springs or tubes and reservoirs have been made with small reservoirs for the liquid and comparatively large springs or tubes or like devices for actuating the indicating or recording arms. Said reservoirs were usually made of steel, without provisions for rendering the same expansible with increase of pressure due to the expansion of the fluid under increase of temperature. Such instruments are intended and adapted for use only when reservoir and actuating device are in one locality and both subjected to the temperature to be measured. The very great pressure in the reservoir, caused by increase of temperature, has prevented the use of such instruments in general, while if reservoir and the actuating springs or tubes of the recording device were located in separated localities of normally-different temperatures a large error would be induced by the differences in temperatures at the two parts.

The object of my present invention is to remedy these defects by providing a thermometer not appreciably affected by barometric changes, and in which the volume of reservoir is very large compared to the volume of the spring or tube of the indicating or recording device, and to provide means whereby said reservoir can expand sufficiently to avoid excessive pressures within the instrument. In view of this large difference in volumes of reservoir and tube the error due to normal difference in temperature at the reservoir and at the spring or tube of the recording device, when in different localities of different temperatures, is reduced to practically nothing.

The essential features of my invention are, therefore, first, a recording device containing an expansible spring or tube adapted to be placed in one locality; secondly, an expansible reservoir having a large volume compared to that of the spring or tube of the indicating or recording device and adapted to be placed in the locality of which the temperature is to be measured, and, thirdly, a communication between the spring or tube and reservoir.

The indicating or recording device may consist of a Bourdon tube or spring or of a series of the same, or of any properly-formed diaphragm tube to which movement is imparted by variations in pressure and volume of the actuating-fluid, combined with an indicating or recording arm actuated by or from said tube or spring. The reservoir may consist of a series of such Bourdon springs or tubes having collectively a considerably larger volume than that of the spring or tube of the indicating or recording device, or it may consist of a cylinder closed by an expansible diaphragm, or of any known device capable of expansion under pressure without permitting escape of fluid.

The nature of my invention will best be understood when described in connection with the accompanying drawings, in which—

Figure 1 is a sectional elevation of a recording-thermometer constructed according to my invention. Fig. 2 is a side elevation partly in section. Fig. 3 is a front elevation illustrating a modified form. Fig. 4 is a sectional elevation illustrating a modified form for the reservoir.

Similar letters of reference designate corresponding parts throughout the several views of the drawings.

Referring at present to Figs. 1 and 2 of the drawings, the letter A designates a recording device quite similar in construction to that shown and described in Letters Patent No. 514,256, granted to W. H. Bristol and E. H. Bristol, dated February 6, 1894.

C is the spring or tube consisting of a metallic tube of flattened cross-section formed into a helix, one end of which is secured to a plate e attached to the casing and having a perforation or channel extending transversely through the same and communicating with said end of the spring or tube. To the upper or free end of the spring is attached, at substantially right angles to the axial line thereof, by soldering or otherwise, a recording-arm D, the upper end of which is provided with a suitable style a, (or pencil,) arranged to bear upon the chart E, which latter is rotated, as usual, by a suitable clock-movement.

The spring described may be considered a series of Bourdon springs or tubes connected end to end to concur in action, and consequently the combined movement of the component springs, under pressure, will be communicated to the free end, or terminal, of the structure, and impart to the same an axial rotation through an angle corresponding substantially to the movements of the several convolutions taken collectively.

Reference-letter R designates the reservoir which is connected by a pipe or tube b with the spring or tube C of the recording device A through the transverse perforation in the plate e. The reservoir and springs or tubes are filled, or, if preferred, partially filled, with a practically incompressible fluid, alcohol being preferred on account of its low freezing-point. In the present example I have shown this reservoir to consist of a series of springs or tubes $C'$ similar in construction to the spring or tube C, but whose aggregate length, and consequently the volume, is greatly in excess of that of the spring or tube C. Said springs or tubes are connected at one end to a common hollow header F, and are left free to move at their other ends. The header F communicates with the spring or tube C through the pipe b. The action of the springs or tubes composing the reservoir, under variation of pressure due to expansion and contraction of the contained fluid, is similar to that of the spring or tube C. By providing a sufficient number of springs or tubes $C'$ to form collectively a reservoir of comparatively large capacity of volume the error due to difference of temperature when the reservoir and recording device are isolated can be reduced to a minimum. It is evident that other forms, which will operate in substantially the same manner, may be adapted both for the recording device and for the reservoir.

In Fig. 3 I have shown the spring or tube $C^2$ of an indicating device in the form of an ordinary Bourdon spring, such as used in indicating pressure-gages, one end of which is connected with the pipe $e'$, while its opposite or free end is connected with and actuates the indicating arm or pointer through the usual multiplying devices. The reservoir $R'$ is built up of a series of like Bourdon springs or tubes $C^3$ connected with a common header $F'$ to which the pipe $e'$ is attached. Again, as shown in Fig. 4, the reservoir may consist of a cylinder $R^2$ closed at one end by a flexible diaphragm f, which cylinder communicates through the pipe $e^2$ with the spring or tube of the recording device. In place of the Bourdon gage a gage constructed on the diaphragm principle may be used.

In general the construction of the spring or tube of the indicating or recording device may be any which will actuate a pointer or recording-arm, while the construction of the reservoir may be any which will permit expansion under variations of pressure and volume of the fluid contained in the instrument.

It is not absolutely essential that the liquid entirely fill the tubes or springs of the instrument, since in case a short range with wide movements of the pointer or recording-arm, part of the spring or tube of the recording device may remain empty, or be filled with an elastic fluid—as, for instance, it may be desired to measure temperatures between, say, 70° to 100°, and this range to cover the entire chart. Therefore in such a case sufficient vacuum would be left that the instrument would begin to record at 70°, and temperatures below 70° would not affect the same any more than the range due to the vacuum formed.

One of the important features of the present construction is that the instrument is not appreciably affected by variations in barometric pressure, in view of the high pressure within the instrument itself.

What I claim as new is—

1. A thermometer comprising in its structure an indicating or recording device, a spring or tube connected with the same, a distant reservoir made expansible to relieve excess of pressure, and having a large volume compared to that of the spring or tube, and a pipe of small cross section connecting said reservoir with the spring or tube; said spring or tube, reservoir and connecting pipe being filled with a liquid to produce a thermometer operating under high pressure, whereby barometric error is eliminated, substantially as described.

2. A thermometer comprising in its structure an indicating or recording arm, a spring or tube in operative connection with the same, a reservoir composed of a series of expansible springs or tubes forming collectively a large volume compared with that of the spring or tube in connection with the indicating or recording arm, a common header for said springs or tubes, and a pipe of small cross-section connecting said header with the spring or tube connected to the indicating or recording arm; said parts being filled with a liquid, substantially as described.

3. A thermometer comprising in its structure an indicating or recording device, a tubular operative member placed in connection with the same, a distant reservoir made expansible to relieve excess of pressure, and having a large volume compared to that of the operative member, and a pipe of small cross section connecting said reservoir with the said operative member; said operative member, reservoir and connecting pipe being filled with a liquid to produce a thermometer operating under high pressure, whereby barometric error is eliminated, substantially as described.

In testimony that I claim the foregoing as my invention I have signed my name in presence of two witnesses.

WILLIAM H. BRISTOL.

Witnesses:
EUGENIE A. PERSIDES,
A. FABER DU FAUR, Jr.